(12) United States Patent
Reynolds et al.

(10) Patent No.: US 11,133,717 B2
(45) Date of Patent: Sep. 28, 2021

(54) WIRELESS POWER SYSTEMS INCLUDING DETERMINATION OF CHANNEL TRANSFER FUNCTION FROM BACKSCATTER SIGNALS

(71) Applicant: University of Washington, Seattle, WA (US)

(72) Inventors: Matthew S. Reynolds, Seattle, WA (US); Daniel Arnitz, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 16/651,984

(22) PCT Filed: Sep. 28, 2018

(86) PCT No.: PCT/US2018/053513
§ 371 (c)(1),
(2) Date: Mar. 27, 2020

(87) PCT Pub. No.: WO2019/067956
PCT Pub. Date: Apr. 4, 2019

(65) Prior Publication Data
US 2020/0266673 A1 Aug. 20, 2020

Related U.S. Application Data

(60) Provisional application No. 62/565,492, filed on Sep. 29, 2017.

(51) Int. Cl.
*H02J 50/80* (2016.01)
*H02J 50/20* (2016.01)
(Continued)

(52) U.S. Cl.
CPC ............ *H02J 50/80* (2016.02); *H02J 50/001* (2020.01); *H02J 50/20* (2016.02); *H02J 50/40* (2016.02); *H02J 7/00034* (2020.01); *H02J 7/02* (2013.01)

(58) Field of Classification Search
CPC .. H02J 50/80; H02J 50/20; H02J 50/40; H02J 50/001; H02J 7/0034
(Continued)

(56) References Cited

U.S. PATENT DOCUMENTS

| 8,922,350 B2 | 12/2014 | Griffin et al. |
| 9,754,139 B2 | 9/2017 | Chemishkian et al. |

(Continued)

FOREIGN PATENT DOCUMENTS

| WO | 2014047253 A1 | 3/2014 |
| WO | 2016109312 A1 | 7/2016 |

(Continued)

OTHER PUBLICATIONS

International Search Report and Written Opinion dated Dec. 11, 2018 for PCT Application No. PCT/US2018/053513, 25 pages.
(Continued)

*Primary Examiner* — John W Poos
(74) *Attorney, Agent, or Firm* — Dorsey & Whitney LLP

(57) ABSTRACT

Examples described herein utilize a backscatter signal provided by a wirelessly powered device to estimate channel information, (e.g., a channel transfer function) between the wirelessly powered device and a transmitter system. The channel information may be used to optimize MIMO power transfer for linear as well as nonlinear backscatter devices. Examples of die method 'may shift some or all of the power cost and complexity of coherent channel measurements from the WFD to the transmitters), and allow WPT optimization to milliwatt- or microwatt-class wirelessly powered devices.

18 Claims, 3 Drawing Sheets

(51) Int. Cl.
*H02J 50/40* (2016.01)
*H02J 50/00* (2016.01)
*H02J 7/00* (2006.01)
*H02J 7/02* (2016.01)

(58) Field of Classification Search
USPC .......................................................... 307/104
See application file for complete search history.

(56) References Cited

U.S. PATENT DOCUMENTS

| | | | |
|---|---|---|---|
| 9,800,059 | B2 | 10/2017 | Reynolds et al. |
| 2008/0139153 | A1 | 6/2008 | Tuo et al. |
| 2010/0217553 | A1 | 8/2010 | Von Novak et al. |
| 2011/0274182 | A1 | 11/2011 | Mielczarek et al. |
| 2013/0147609 | A1 | 6/2013 | Griffin et al. |
| 2014/0055088 | A1 | 2/2014 | Joshi |
| 2014/0072060 | A1 | 3/2014 | Patel et al. |
| 2014/0084855 | A1 | 3/2014 | Joshi |
| 2015/0091706 | A1* | 4/2015 | Chemishkian .......... H02J 50/20 340/10.34 |
| 2015/0229133 | A1 | 8/2015 | Reynolds et al. |
| 2016/0365890 | A1 | 12/2016 | Reynolds et al. |
| 2017/0208597 | A1 | 7/2017 | Gollakota et al. |

FOREIGN PATENT DOCUMENTS

| | | | |
|---|---|---|---|
| WO | 2017027847 | A1 | 2/2017 |
| WO | 2019067956 | A1 | 4/2019 |

OTHER PUBLICATIONS

Arnitz, et al., D. Arnitz and M. Reynolds, "Multitransmitter wireless power transfer optimization for backscatter RFID transponders," IEEE Antennas Wireless Propag. Lett., vol. 12, No. 1, pp. 849-852, Jul. 2013.

Arnitz, et al., D. Arnitz and M. Reynolds, "Wireless power transfer optimization for nonlinear passive backscatter devices," in Proc. IEEE Int RFID Conf Orlando, Florida, May 2013, pp. 245-252.

Arnitz, et al., D. Arnitz, G. Adamiuk, U. Muehlmann, and K. Witrisal, "UWB channel sounding for ranging and positioning in passive UHF RFID," in 11th COST2100 MCM, Aalborg, Denmark, Jun. 2010.

Arnitz, et al., D. Arnitz, U. Muehlmann, and K. Witrisal, "Characterization and modeling of UHF RFID channels for ranging and localization,," IEEE Trans. Antennas Propag., vol. 60, No. 5, pp. 2491-2601, May 2012.

Arnitz, et al., D. Arnitz, U. Muehlmann, and K. Witrisal, "Multifrequency continuous-wave radar approach to ranging in passive UHFRFID,"IEEE Trans. Mierow. Theory Tech., vol. 57, No. 5, pp. 1398-1405, Jul. 2009.

Arnitz, et al., D. Arnitz, U. Muehlmann, and K. Witrisal, "Tag-based sensing and positioning in passive UHF RFID: Tag reflection," in 3rd Int. EURASIP workshop on RFID Techn., Cartagena, Spain, Sep. 2010, pp. 51-56.

Baghaei-Nejad, et al., M. Baghaei-Nejad, et al; "A remote-powered RFID tag with IOMb/s UWB uplink and—18.5dBm sensitivity UHF downlink in 0.18µ CMOS," in Proc. IEEE Int. Solid-State Circuits Conf (ICC), Feb. 2009, pp. 198-199.

Bolomey, et al., J. Bolomey, S. Capdevila, L. Jofre, and J. Romeu, "Electromagnetic modeling of RFID-modulated scattering mechanism. Application to tag performance evaluation," Proc. IEEE, vol. 98, No. 9, pp. 1555-1569, Jul. 2010.

Chalise, et al., B. K. Chalise, Y. D. Zhang, and M. G. Amin, "Simultaneous transfer of energy and information for MIMO-OFDM relay system," in Proc. IEEE Int. Conf. on Comm. in China (ICCC 2012), Aug. 2012, pp. 540-545.

Denicke, et al., E. Denicke, M. Henning, H. Rabe, and B. Geck, "The application of multiport theory for MIMO RFD backscatter channel measurements," in Proc. European Microwave Conf. (EuMA), Oct. 2012, pp. 522-525.

Fouladgar, et al., A. Fouladgar and 0. Simeone, "On the transfer of information and energy in multi-user systems,"IEEE Commun. Lett., vol. 16, No. 11, pp. 1733-1736, Oct. 2012.

Griffin, et al., J. D. Griffin and G. D. Durgin, "Multipath fading measurements for multi-antenna backscatter RFID at 5.8 GHz," in Proc. IEEE Int RFID Conf, Apr. 2009, pp. 322-329.

Grifiin, et al., J. D. Griffin and G. D. Durgin, "Gains for RF tags using multiple antennas," IEEE Trans. Antennas Propag., vol. 56, No. 2, pp. 563-570, Feb. 2008.

Hasan, et al., A. Hasan, C. Zhou, and J. Griffin, "The phase difference method for transmit diversity in monostatic RFID systems," in IEEE Antennas and Propagation Society Int. Symposium (APSURSI), Jul. 2012, pp. 1-2.

He, et al., C. He, X. Chen, Z. J. Wang, and W. Su, "On the performance of MIMO RFID backscattering channels," EURASIP Journal on Wireless Communications and Networking, No. 357, Nov. 2012.

Huang, et al., K. Huang and E. Larsson, "Simultaneous information and power transfer for broadband wireless systems," IEEE Trans. Signal Process., vol. 61, No. 23, pp. 5972-5986, Sep. 2013.

Ingram, et al., M.A. Ingram, M. F. Demirkol, and D. Kim, "Transmit diversity and spatial multiplexing for RF links using modulated backscatter," in International Symposium on Signals, Systems, and Electronics, Jul. 2001, pp. 1-4.

Jin, et al., S. Jin, M. McKay, X. Gao, and I. Collings, "MIMO multichannel beamforming: SER and outage using new eigenvalue distributions of complex noncentral Wishart matrices," IEEE Trans. Commun., vol. 56, No. 3, pp. 424-434, Mar. 2008.

Kellogg, et al., "Wi-Fi backscatter: Internet connectivity for RF-powered devices", ACM SIGCOMM Computer Communication Review, Aug. 2014, pp. all.

Koomey, et al, J. Koomey, S. Berard, M. Sanchez, and H. Wong, "Implications of historical trends in the electrical efficiency of computing," IEEE Ann. Hist. Comput., vol. 33, No. 3, pp. 46-54, Mar. 2011.

Liao, et al., Liao, et al.; "A 3µW wirelessly powered CMOS glucose sensor for an active contact lens," in Proc. IEEE Int. Solid-State Circuits Conf (ISSCC), Jan. 2012, pp. 38-40.

Liu, et al., "Ambient backscatter: wireless communication out of thin air", ACM SIGCOMM Computer Communication Review, Aug. 2013, 13 pgs.

Nikitin, et al., P. V. Nikitin, R. Martinez, S. Ramamurthy, H. Leland, G. Spiess, and K. V. S. Rao, "Phase based spatial identification of UHF RFID tags," in Proc. IEEE Int Rfid Conf, Apr. 2010, pp. 102-109.

Occhiuzzi, et al., C. Occhiuzzi, G. Contri, and G. Marrocco, "Design of implanted RFID tags for passive sensing of human body: The STENTag," IEEE Trans. Antennas Propag., vol. 60, No. 7, pp. 3146-3154, May 2012.

Ordonez, et al., L. Ordonez, D. Palomar, and J. Fonallosa, "Ordered eigenvalues of a general class of Hermitian random matrices with application to the performance analysis of MIMO systems," IEEE Trans. Signal Process., vol. 57, No. 2, pp. 672-689, Oct. 2008.

Park, et al., J. Park and B. Clerckx, "Joint wireless information and energy transfer in a two-user MIMO interference channel," IEEE Trans. Wireless Commun., vol. 12, No. 8, pp. 4210-4221, Apr. 2013.

Parks, et al., "Turbocharging ambient backscatter communication." ACM SIGCOMM Computer Communication Review, Aug. 2014, pp. all.

Sarac, et al., [1] A. Sarac, N. Absi, and S. Dauzre-Prs, "A literature review on the impact of RFID technologies on supply chain management," International Journal of Production Economics, vol. 128, No. 1, pp. 77-95, Mar. 2010.

Thomas, et al., S. Thomas, E. Wheeler, J. Teizer, and M. Reynolds, "Quadrature amplitude modulated backscatter in passive and semipassive UHF RFID systems," IEEE Trans. Mierow. Theory Tech., vol. 60, No. 4, pp. 1175-1182, Feb. 2012.

Trotter, et al., M. Trotter, J. Griffin, and G. Durgin, "Power-optimized waveforms for improving the range and reliability of RFID systems." in Proc. IEEE Int RFID Conf, Apr. 2009, pp. 80-87.

Xu, et al., J. Xu and R. Zhang, "Energy beamforming with one-bit feedback," in Proc. IEEE Int. Conf. on Acoustics, Speech, and Signal Proc. (ICASSP), May 2014.

(56) References Cited

OTHER PUBLICATIONS

Yang, et al., "Multi-antenna wireless energy transfer for backscatter communication systems.", IEEE Journal on Selected Areas in Communications, Mar. 2015, pp. 1-30.

Zhang, et al,, R. Zhang and C. K. Ho, "MIMO broadcasting for simultaneous wireless information and power transfer," in Proc, IEEE Global Telecommunications Conf. (GLOBECOM 2011), Mar. 2011, pp. 1-5.

Arnitz, et al., "MIMO Wireless Power Transfer for Mobile Devices", IEEE Pervasive Computing vol. 15, Oct. 2016, p. 36-44.

Besnoff, et al., "Near field modulated backscatter for in vivo biotelemetry", IEEE International RFID Conference, 2012, p. 135-140.

Boyer, et al., "Space time coding for backscatter RFID", IEEE Trans. Wireless Communications, vol. 12, No. 5, May 2013, p. 2272-2280.

Hansen, R.C., "Relationships between antennas as scatterers and as radiators", Proceedings of the IEEE, vol. 77, No. 5, May 1989, p. 659-662.

Miesen, et al., "UHF RFID localization based on synthetic apertures", IEEE Transactions on Automation Science and Engineering, vol. 10, No. 3, Jul. 2013, p. 807-815.

Paulraj, et al., "Introduction to Space-Time Wireless Communications", Cambridge University Press, ISBN-13: 9-780521826150, 2003.

Proakis, et al., "Communication Systems Engineering", Prentice Hall, 2nd Edition, ISBN-13: 978-0130617934, 2003.

Reinisch, et al,, "A multifrequency passive sensing tag with on-chip temperature sensor and off-chip sensor interface using EPC HF and UHF RFID technology", IEEE Journal of Solid-State Circuits, vol. 46, No. 12, Dec. 2011, p. 3075-3088.

Smietanka, et al., "Modeling and simulation of MISO diversity for UHF RFID communication", Proceedings of the Federated Conference on Computer Science and Information Systems (FedCSIS), 2012, p. 813-820.

Yaeger, et al., "A 9.2uA Gen-2 compatible UHF RFID sensing tag with 12dBm sensitivity and 1.25uVrms input-referred noise floor", IEEE International Solid-State Circuits Conference (ISSCC), Feb. 8, 2010, p. 52-53.

Zeng, et al., "Optimized training design for wireless energy transfer", IEEE Transactions on Communications vol. 63, Issue 2, Feb. 2015, p. 536-550.

Zheng, et al., "On the transmit signal design at the reader for RFID MIMO systems", Fourth International EURASIP Workshop on RFID Technology, 2012, p. 59-64.

* cited by examiner

WIRELESS POWER SYSTEMS INCLUDING DETERMINATION OF CHANNEL TRANSFER FUNCTION FROM BACKSCATTER SIGNALS

CROSS-REFERENCE TO RELATED APPLICATION(S)

This application is a 35 U.S.C. § 371 National Stage Application of PCT Application No. PCT/US2018/053513, filed Sep. 28, 2018, which claims the benefit under 35 U.S.C. § 119 of the earlier tiling dare of U.S. Provisional Application Ser. No. 62/565,492 filed Sep. 29, 2017, the entire contents of which are hereby incorporated by reference, in their entirety, for any purposes.

TECHNICAL FIELD

Examples described herein, relate generally to systems and devices for wireless power transfer. Examples of systems which estimate a channel information from a backscatter signal are described.

BACKGROUND

With the increasing emphasis on power efficiency of wireless sensing and computing devices, the impetus to "cut the last cord" and wirelessly power those devices has also increased. There is a tremendous unmet market demand for eliminating and/or reducing a need for batteries, given their associated cost, size, and maintenance (e.g., recharging and eventual replacement) requirements.

The future is increasingly bright for extending wirelessly powered technology beyond the simple case of RPM tags to encompass a variety of other increasingly sophisticated wirelessly powered computing and communication devices. A lesser known corollary to Moore's Law suggests that the power requirements of a given compute task are halving every 18 months due to continuous improvements in processor efficiency. If this trend continues as expected, an increasing number of computational tasks will fall within the limited power budgets achievable with long-range, far-field wireless power transfer.

While significant progress has been made over the past decade to reduce the power consumption and increase the harvesting efficiency of wirelessly powered devices (WPDs), the transmitter side has received less attention. Power-optimized waveforms (POWs), and multiple-input multiple-output (MIMO) systems are two transmitter-side technologies that are potentially able to significantly increase the power transferred to WPDs. POWs generally refer to transmit waveforms with a high peak-to-average ratio that can yield improved harvesting efficiency, compared to continuous-wave (CW) signals, with diode-based RF power harvesters. MIMO systems leverage spatial diversity achieved through multiple transmit/receive antennas to overcome the adverse effects of multipath propagation and allow focusing power. However, these techniques require detailed knowledge of the multipath propagation channel, which may be a single-path channel (e.g., channel state information) or, alternatively, the incident power level at the WPDs. In both cases the wirelessly powered device (e.g., the mobile device) has to play an active role in the optimization, either through power measurements or, ideally, through cooperative channel measurements. Channel measurements in particular are complex to implement due to the required coherent estimation and synchronization between all participants. The participation of the WPDs in the power optimization thus comes at a significant power cost to the WPDs.

MIMO, techniques have been applied to backscatter communication. A common assumption and prerequisite in these systems is knowledge of the channel information between power transmitters and WPDs. This requirement introduces the need far coherent channel measurements, which comes at a significant power cost to the WPDs and presents a barrier to integration into milliwatt- or microwatt-class devices. The same is true for methods that require the WPDs to measure their own power level and send feedback to the wireless power transfer (WPT) system.

SUMMARY

Examples of devices are described herein. An example device may include at least one transmitter configured to provide a wireless power signal to at least one wirelessly powered device using multiple antennas, multiple frequencies, or combinations thereof. The device may further include at least one receiver configured to receive backscatter signals from the at least one wirelessly powered device. The device mat limiter include a controller configured to estimate channel information for the channels between the at least one of the wirelessly powered device and at least one of the multiple antennas based on the backscatter signals.

In some examples, the controller may be further configured to adjust the wireless power signal based on the estimate of the channel information.

In some examples, the controller may be further configured to use the channel information in part to provide a desired data rate, signal-to-noise ratio, or combination thereof.

In some examples, the controller may be configured to use the channel information to adjust the at least one receiver.

In some examples, the at least one transmitter comprises a single transmitter configured to transmit at multiple frequencies.

In some examples, the at least one transmitter comprises a single transmitter coupled to the multiple antennas.

In some examples, the at least one transmitter comprises a plurality of transmitters dispersed in an environment, each of the plurality of transmitters coupled to at least a respective one of the multiple antennas. In some examples, at least one of the plurality of transmitters is configured to transmit at a different frequency, set of frequencies, using a different waveform, or combinations thereof, than another of the plurality of transmitters.

In some examples, the backscatter signal is provided by the wirelessly powered device during power harvesting from the wireless power signal.

In some examples, the wirelessly powered device comprises a battery configured to at least partially power the wirelessly powered device.

In some examples, the device generating the backscatter signal is not powered by the wireless power signal.

In some examples, the backscatter signal is provided at a harmonic frequency of die wireless power signal.

In some examples, the controller may be configured to adjust a phase, an amplitude, or both of the wireless power signal based on the estimate of the channel information to control an amount of power transferred to the wirelessly powered device by the wireless power signal.

In some examples, the controller may be configured to adjust the wireless power signal iteratively at least in part by applying initial adjustments to the wireless power signal, calculating further adjustments based on models of the wirelessly powered device, the transmitter, the receiver, or combinations thereof, and applying the further adjustments to the wireless power signal.

In some examples, the controller may be configured to adjust the wireless power signal at least in part by calculating all adjustments to the wireless power signal based on models of the wirelessly powered device, the transmitter, the receiver, or combinations thereof, and applying calculated adjustments to the wireless power signal.

In some examples, the backscatter signal includes data indicative of an identification, power level, or power need of the at least one wirelessly powered device.

In some examples, the backscatter signal includes data indicative of power harvester characteristics of the wirelessly powered device.

In some examples, the controller is configured to use a model of a harvester characteristic of the wirelessly powered device to control an amount of power transferred to the wirelessly powered device by the wireless power signal.

In some examples, the controller is configured to update the model of the harvester characteristic through optimization, machine learning or other learning techniques.

In some examples, the wireless power signal comprises respective waveforms configured to be transmitted by at least one of the multiple antennas, and wherein the waveforms have properties configured to deliver a desired amount of power to the wirelessly powered device.

In some examples, the controller is further configured to adjust the wireless power signal to provide a desired power to a selected one or group of the at least one wirelessly powered devices.

In some examples, the controller is further configured to adjust the wireless power signal to maximize power delivered to a selected one or croup of the at least one wirelessly powered devices while minimizing the power delivered to another one or another group of the at least one wirelessly powered devices.

In some examples, the controller is further configured to adjust the wireless power signal to maximize a minimum power level delivered to a group of the at least one wirelessly powered devices.

Examples of methods are described herein. An example method may include transmitting a wireless power signal using a multiple antenna system, the multiple antenna system configured to transmit the wireless power signal using multiple antennas, multiple frequencies, or combinations thereof. The method may further include backscattering, by at least one wirelessly powered device, at least a portion of the wireless power signal to provide a backscatter signal. The method may further include receiving the backscatter signal at the multiple antenna system, and utilizing the backscatter signal to provide an estimate of channel information between the at least one wirelessly powered device and the multiple antenna system.

In some examples, methods may further include adjusting the wireless power signal based on the estimate of the channel information.

In some examples, methods may further include comprising using the channel information in part to provide a desired data rate, signal-to-noise ratio, or combination thereof.

In some examples, methods may include using the channel information to adjust the at least one receiver.

In some examples, backscattering may occur during power harvesting from the wireless power signal.

In some examples, backscattering may provide the backscatter signal at a harmonic frequency of the wireless power signal.

In some examples, adjusting may include adjusting a phase, an amplitude, or both of the wireless power signal based on the estimate of the channel information to control an amount of power transferred to the wirelessly powered device by the wireless power signal.

In some examples, adjusting may include adjusting the wireless power signal iteratively at least in part by applying initial adjustments to the wireless power signal, calculating further adjustments based on models of the wirelessly powered device, the transmitter, the receiver, or combinations thereof, and applying the further adjustments to the wireless power signal.

In some examples, adjusting may include adjusting the wireless power signal iteratively at least in part by calculating all adjustments to the wireless power signal based on models of the wirelessly powered device, the transmitter, the receiver, or combinations thereof, and applying calculated adjustments to the wireless power signal.

In some examples, methods may include encoding the backscatter signal with data indicative of an identification, power level, or power need of the wirelessly powered device.

In some examples, methods may include encoding the backscatter signal with data indicative of power harvester characteristics of the wirelessly powered device.

In some examples, methods may include controlling an amount of power transferred to the wirelessly powered device by the wireless power signal based on a model of a harvester characteristic of the wirelessly powered device.

In some examples, methods may include updating the model of the harvester characteristic through optimization, machine learning or other learning techniques.

In some examples, transmitting the wireless power signal comprises transmitting respective waveforms configured to be transmitted by multiple antennas of the multiple antenna system, and wherein the waveforms have properties configured to deliver a desired amount of power to the wirelessly powered device.

In some examples, backscattering comprises providing varying impedances at an antenna or the wirelessly powered device to provide the backscatter signal.

In some examples, utilizing the backscatter signal to provide the estimate of the channel information comprises taking a ratio of backscatter signals received by certain antennas of the multiple antenna system and a particular backscatter signal received by a particular antenna of the multiple antenna system.

In some examples, methods may include adjusting the wireless power signal to provide a desired power to a selected one or group of the at least one wirelessly powered devices.

In some examples, methods may include adjusting the wireless power signal to maximize power delivered to a selected one or group of the at least one wirelessly powered devices while minimizing the power delivered to another one or another group of the at least one wirelessly powered devices.

In some examples, methods may include adjusting the wireless power signal to maximize a minimum power level delivered to a group of the at least one wirelessly powered devices.

Examples of systems are described herein. An example system may include a wirelessly powered device. The wirelessly powered device may include a power harvester, which may be configured to harvest power front wireless power signals incident on the wirelessly powered device. The wirelessly powered device may include a backscatter transmitter configured to backscatter at least a portion of the wireless power signals to provide a backscatter signal. The system may include a multiple antenna system. The multiple antenna system may include multiple antennas, a receiver configured to receive the backscatter signal, and a transmission system configured to provide the wireless power signals at one or more frequencies for transmission by each of the multiple antennas in accordance with a cost function configured to achieve a desired power transfer to the wirelessly powered device and in accordance with an estimate of channel information, wherein the channel information is determined from the backscatter signal received at the wirelessly powered device.

In some examples, the power harvester may include a diode.

In some examples, the backscatter transmitter may include a transistor.

In some examples, the backscatter signal may be provided at a harmonic frequency of the wireless power signals.

In some examples, the backscatter signal may be provided at a harmonic frequency of the wireless power signals.

In some examples, the multiple antenna system may include multiple units distributed about an environment, each unit comprising at least one of the multiple antennas and at least a portion of the transmission system.

In some examples, the backscatter transmitter may be configured to encode the backscatter signal with data indicative of an identification, power level, or power need of the wirelessly powered device.

In some examples, the transmission system may be configured to provide the wireless power signals in a manner which optimizes delivery of wireless power to the wirelessly powered device.

DETAILED DESCRIPTION

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples described herein utilize a backscatter signal provided by a wirelessly powered device to estimate channel information (e.g., a channel transfer function) between the wirelessly powered device and a transmitter system. The channel information may be used to optimize MIMO power transfer for linear as well as nonlinear backscatter devices. Examples of the method may shift some or all of the power cost and complexity of coherent channel measurements from the WPD(s) to the transmitter(s), and allow WPT optimization to milliwatt- or microwatt-class wirelessly powered devices.

Examples described herein play be used with linear and/or nonlinear backscatter transponders and linear and/or nonlinear power harvesters at the wirelessly powered device. Optimization techniques are described which can be applied to wideband signals such as power-optimized waveforms (POWs) in order to promote and/or ensure constructive interference at the WPD(s). Generally, WPD(s) may refer to single or multiple WPDs, each having one or more antennas and/or harvesters. Examples of techniques are described to extract channel information (e.g., narrowband forward and reverse link channel gains) directly from backscatter signals, without the need for and/or with reduced need for known on-tag calibration standards. In this manner, backscatter communication, already used for passive UHF RFID tags, can be used to infer channel information (e.g., the forward link channel gains) and thus optimize this link with only minimal power costs at the WPD(s). This may be used with CW signals used in UHF RFID, as well as multi-carrier POWs, and also more complex waveforms. Backscatter-based optimization may be fully equivalent in some examples to forward-link-based optimization with cooperative WPDs. This may be used for all classes of linear (e.g., active and buttery-assisted passive) and nonlinear (e.g., fully passive) backscatter links on an arbitrary WPD or multiple WPDs.

Figure 1:
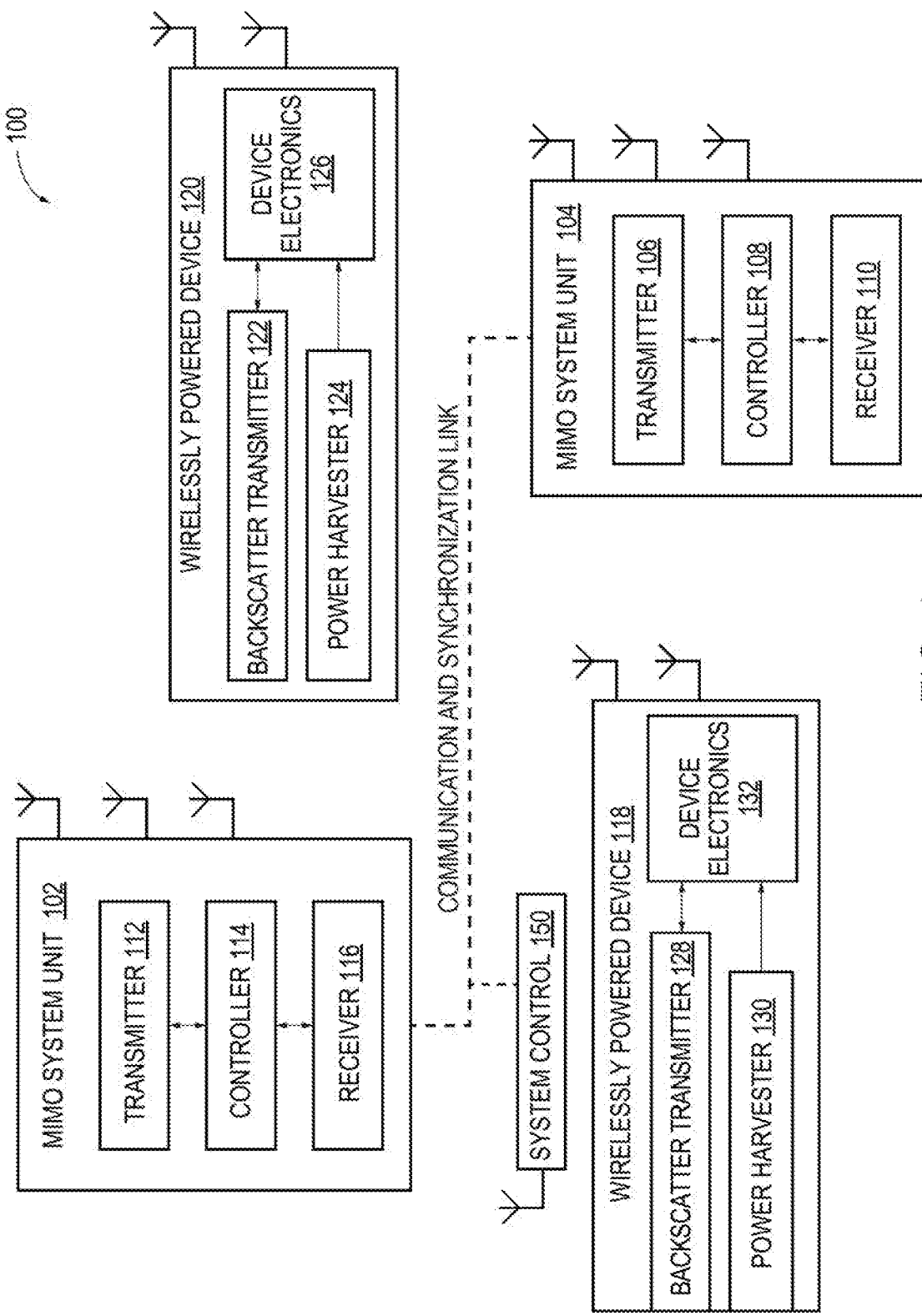
FIG. 1 is a schematic illustration of a system 100 in accordance with examples described herein.

FIG. 1 is a schematic illustration of a system arranged in accordance with examples described herein. System 100 as shown includes two MIMO system units—MIMO system unit 102 and MIMO system unit 104. MIMO system unit 102 includes transmitter 112, controller 114, and receiver 116. MIMO system unit 104 includes transmitter 106, controller 108, and receiver 110. System 100 as shown includes two wirelessly powered devices—wirelessly powered device 118 and wirelessly powered device 120. Wirelessly powered device 118 includes backscatter transmitter 128, power harvester 130, and device electronics 132. Wirelessly powered device 120 includes backscatter transmitter 122, power harvester 124, and device electronics 126. System 100 as shown also includes system control 150. During operation, the MIMO system unit 102 and MIMO system unit 104 may form a multiple antenna system which may provide wireless power to wirelessly powered device 118 and wirelessly powered device 120 by transmitting wireless power signals. MIMO system units within a multiple antenna system may communicate using one or more communication and/or synchronization links (e.g., communication and synchronization link as shown in FIG. 1). The communication and/or synchronization link may be implemented as wired or wireless link and may be implemented using the MIMO system unit antenna(s). Additional, fewer, and/or different components may be included in other examples.

System control 150 may be implemented using one or more processor(s), controllers, circuitry, and/or memory storing executable instructions for performing functions described herein (e.g., software). Ire some examples, system control 150 may be integrated into one or more of the MIMO system units in a multiple antenna system. System control 130 may, during operation, receive information from MIMO units 102 and/104 (e.g., on the communication and synchronization link shown), analyze the information, calculate or otherwise provide selections for operation of the MIMO units 102 and/or 104 for wireless power transfer to WPDs 110 and 120, and distribute this information hack to MIMO units 102 and 104.

The MIMO units 102 and 104 may or may not be fully controlled by the system control 150 in some examples. They also may or may not exchange information directly. Parts or all of the functionality of controllers 108 and 114 may be implemented in the system control 150 in some implementations. In some examples, some or all of the functionality of the system control 150 may reside in the individual controllers 108 and 114.

Accordingly, examples of systems described herein may include one or more MIMO system units which may themselves form, or combined may form, a multiple antenna system. While two MIMO system units (MIMO system unit 102 and MIMO system unit 104) are shown in FIG. 1, any number may be provided including 1, 2, 3, 4, 5, 6, 7, 8, 9, 10, or more WAD system units. The MIMO system units (or one MIMO system unit in some examples) may combine to form a multiple antenna system. Generally, a multiple antenna system refers to a system having multiple antennas and which controls transmissions from those antennas in accordance with a cost function (e.g., to create an overall desired characteristic of the transmitted signals from the multiple antennas). In some examples, one or more MIMO system units may provide power-optimized waveforms (e.g., POWs). Generally, a POW may be formed from one or more antennas using multiple frequencies. All frequencies may be transmitted from a single antenna, or groups of frequencies may be transmitted from multiple antennas. In some examples, each antenna may provide a different frequency or range of frequencies. Accordingly, MIMO system units (or one MIMO system unit in some examples) may also or instead combine to form a multiple frequency system. Generally, a multiple frequency system refers to a system having multiple frequencies and which controls transmissions from those frequencies in accordance with a cost function (e.g., to create an overall desired characteristic of the transmitted signals from the multiple antennas). In some examples described herein, the cost function may be implemented to maximize or otherwise meet a desired criteria on an amount of power transferred by the wireless power signals.

Each MIMO system unit may accordingly have one or more antennas—including 1, 2, 3, 4, 16, 32, 64, 128, 356, or another number of antennas. The amplitude, phase, waveform and/or other characteristics of signals (e.g., wireless power signals) transmitted by the antennas may be determined in accordance with a cost function to achieve a desired characteristic of transmission. Moreover, in examples described herein, the amplitude, phase, waveform and/or other characteristics of the transmitted signals may be determined in accordance with a channel information representing a magnitude and phase response of a channel between the transmitter and the wirelessly powered device. Wireless power signals transmitted by multiple antenna systems and/or multiple frequency systems described herein may accordingly be determined and/or adjusted based on a cost function and/or an estimate of a channel information in order to increase (e.g., maximize or minimize) an amount of transmitted power and/or to achieve a desired level of power transfer. Generally, wireless power signals may refer to radio frequency (RE) signals front which power may be extracted. In some examples, the channel information may be used to adjust (e.g., control) a desired data rate, signal-to-noise ratio, or bath at a particular device and/or system or of received backscatter signals. The data rate and/or signal-to-noise ratio may be at the transmitter, receiver, or the wirelessly powered device.

Accordingly, multiple antenna systems described herein may include one or more MIMO system units. Each MIMO system unit may include any number of antennas and a transmitter, receiver, and controller. When only one MIMO system unit is used, the single MIMO system unit may generally itself have multiple antennas. Accordingly, multiple antenna systems described herein may include a single transmitter coupled to multiple antennas and/or may include multiple transmitters dispersed about an environment, each of the transmitters coupled to one or more antennas. Additionally or instead, each MIMO system unit may operate at one or more frequencies. When only one MIMO system unit is used, the single MIMO system unit may generally itself transmit using multiple frequencies. Accordingly, multiple antenna systems described herein may include a single transmitter configured to transmit at multiple frequencies and/or may include multiple transmitters, which may be dispersed about an environment, each of the transmitters configured to transmit at one or more frequencies. The transmitters may together be referred to as a transmission system. The environment may be, for example, a building, a floor, a room, an outdoor area, etc. Examples of multiple antenna systems and/or MIMO system units may include one or more base stations.

In some examples, transmitters described herein may transmit at one or multiple frequencies. The choice of frequencies used by various transmitters and/or antennas in the system may be selected in accordance with a desired cost function and/or channel information. Generally, transmitters within a multiple antenna and/or multiple frequency system may operate in conceit to achieve a desired power delivery (e.g., optimize power delivery) to one or more WPDs.

As an example, MIMO system unit 102 includes transmitter 112, controller 114, and receiver 116. Additional components May be included in MIMO system unit 102 but are omitted for brevity. Description provided herein for the components of MIMO system unit 102 may apply analogously to the components of MIMO system unit 104. The transmitter 112 may be coupled to one or more antennas and may cause the one or more antennas to transmit all or a portion of a wireless power signal. The wireless power signals provided by the antennas may have an amplitude, phase, and waveform which May allow for harvesting of power by a wirelessly powered device. In some examples, power-optimized waveforms may be used, winch may include waveforms having properties selected to deliver a desired amount of power (e.g., an optimal amount of power) to one or more wirelessly powered devices.

During operation, the transmitter 112 may provide a signal, which may be referred to as a carrier, which may be backscattered by backscatter transmitter(s) described herein at one or more wirelessly powered devices. In some example, the carrier may be a single tone carrier. In some examples, the carrier may have a more complex waveform. In some examples, a wireless power signal itself, or a portion thereof may be backscattered by backscatter transmitters described herein.

The receiver 116 may receive a backscatter signal from a wirelessly powered device. In some examples, the receiver 116 may include and/or be coupled to signal processing components to achieve and/or improve the SNR at the receivers, which may aid in improvement (e.g., optimization) of power delivery and/or increase data rates available.

Some examples described herein may leverage an asymmetric nature of backscatter systems by optimizing for power delivery at the transmitter 112 and for data rates at the receiver 116.

The controller 111 may be implemented using one or more processors and/or circuitry to provide functions described herein. Microcontrollers, general-purpose central processing units (CPUs), field programmable gate, arrays (FPGAs), and/or application specific integrated circuits (ASICs) may be used. The controller 114 may estimate a channel information between the wirelessly powered device and the transmitter (e.g., between the wirelessly powered device and at least one of the antennas coupled to the transmitter 112). The controller 114 may utilize the backscatter signal received by receiver 116 from a wirelessly powered device (e.g., wirelessly powered device 118) to estimate the channel information. The channel information may generally refer to any of a variety of information regarding the channel between the wirelessly powered device and the transmitter. For example, channel information may include forward and/or reverse channel gains. In some examples, channel information may include a channel transfer function. The channel transfer function generally refers to a magnitude and phase response of the communication channel, as a function of frequency. In some examples, channel information may be estimated in part by taking a ratio of backscatter signals received by certain antennas of the multiple antenna system and a particular backscatter signal received by a particular antenna of the multiple antenna system. Channel information may include complex-valued or real-valued channel transfer functions, complex-valued or real-valued channel gain coefficients, or other stationary or time-variant channel characteristics.

The controller 114 may utilize the estimate of the channel information to adjust (e.g., change and/or determine) a phase, frequency, and or waveform of the wireless power signal transmitted by one or more antennas in the multiple antenna system (e.g., coupled to the transmitter 112 and/or another transmitter in the system). In some examples, the controller 114 may provide the settings (e.g., amplitude, phase) for multiple (e.g., all) transmitters in a multiple antenna and/or multiple frequency system based on the received signal at multiple (e.g., all) receivers in the multiple antenna and/or multiple frequency system. Accordingly, the controller 114 may be provided with information from multiple (e.g., all) channels and may provide control data to multiple (e.g., all) transmitters. Information about the received signal at other MIMO units may be provided, for example, over the communication and synchronization link indicated in FIG. 1, which may itself be implemented using one or more wireless channels (e.g., using the antennas shown in FIG. 1). Similarly, information about received signals at various MIMO units may be provided over the communication and synchronization link between MIMO units. The communication and synchronization link in some examples may also function as a synchronization link to synchronize (e.g., provide timing signals to) multiple MIMO system units. Channel information may also be provided on the communication and synchronization link.

In this manner, multiple antenna system described herein may utilize estimates of channel information, generated based on received backscatter signals from wirelessly powered devices, to determine and/or adjust characteristics of wireless power signals provided by the multiple antenna system to the wirelessly powered devices. For example, the phase and/or magnitude of the wireless power signals may be changed in a manner which may increase the amount of power which may harvested by one or more wirelessly powered devices. In this manner, power transfer may be improved and/or optimized in some examples. In some examples, the multiple antenna system may utilize estimates of the channel information to provide a desired data rate and/or signal-to-noise ratio of one or more signals provided by the system or of received backscatter signals.

Accordingly, systems described herein may include any number of wirelessly powered devices. Two wirelessly powered devices, wirelessly powered device 118 and wirelessly powered device 120, are shown in FIG. 1, however any number may be present including 1, 2, 3, 4, 5, 6, 7, 8, 9, 10, or another number of wirelessly powered devices. Wirelessly powered devices may generally be implemented using any electronic device which may utilize power harvested from wireless power signals described herein. Examples of wirelessly powered devices may include cell phones, tablets, tags (e.g., RFID tags), laptops, computers, appliances, watches, medical devices, sensor nodes, toys, or vehicles. Wirelessly powered devices may receive all or a portion of their power from wireless power signals transmitted by multiple antenna systems. In some examples, wirelessly powered devices may include a battery which may be wholly or partially recharged by power harvested from wireless power signals described herein. In some examples, wirelessly powered devices may include another power source (e.g., an AC adapter, USB connection, or other interface for wired power) which may be used in addition to the power harvested from the wireless power signals, and/or may be used from tune to time instead of the power harvested from the wireless power signals. In some examples, wirelessly powered devices may be extremely low-power devices (e.g., sub-milliwatt devices). In examples described herein, the wirelessly powered device may provide a backscatter signal to a transmitter system to allow the transmitter system (e.g., a multiple antenna system) to estimate a channel information (e.g., channel gain and/or channel state information). In this manner, computational load required to be performed at the wirelessly powered device to estimate the channel state information may be reduced, allowing for the wirelessly powered device to have even lower power requirements.

The wirelessly powered device 118 includes backscatter transmitter 128, power harvester, 130, and device electronics 132. Operation of the backscatter transmitter 122, power harvester 124, and device electronics 126 of wirelessly powered device 120 may be analogous to the components described with reference to wirelessly powered device 118.

Power harvesters, such as power harvester 130, may harvest power from incident wireless power signals. Power harvester 130 may be coupled to one or more antennas of the wirelessly powered device, and may extract DC power from energy incident on those antenna(s). The power harvester 130 may include circuitry that may provide DC power from incident RF energy. Any of a variety of power harvesting circuitry may be used. In some examples, the power harvester 130 may include a diode and/or other nonlinear electronic components.

Backscatter transmitters, such as backscatter transmitter 128, may be used to backscatter incident energy to provide a backscatter signal. Generally, backscattering refers to varying amounts of reflection, for example by presenting different impedances to the incident RF energy at one or more antennas, creating differing amounts of reflection. In this manner, backscatter transmitters may modulate the radar cross section presented to an incident signal by changing the impedance presented to the signal. Accordingly, the backscatter transmitter 128 may be coupled to one or more antennas of the wirelessly powered device (which may be a same or different set of antennas as those coupled to power harvester 130). Backscatter signals may be generated using any of a variety of modulation techniques. In some examples, the backscatter modulation frequency may be below the coherence bandwidth of the channel between the backscatter transmitter and the transmitter of the multiple antenna system. In some examples, the coherence bandwidth of the channel may be in the range of several MHz (e.g., for typical indoor channels in the UHF bands). Other frequencies and bandwidths may be used in other examples. In some examples, the backscatter transmitter may encode data in the backscatter signal, including, but not limited to, an identification, power level, or power need of the wirelessly powered device. In some examples, backscatter transmitters, such as the backscatter transmitter 128, may be integrated with and/or implemented using power harvesters, such as power harvester 130. For example, in some examples power harvester 130 may incidentally generate a backscatter signal during (e.g., as a result of) power harvesting. In this manner, a backscatter signal may be generated at a harmonic frequency of the incident wireless power signal during power harvesting, in some examples, together with a backscatter signal also generated at the frequency of the incident wireless power signal. In some examples, the backscatter transmitter may encode data in the backscatter signal data of power harvester characteristics of the power harvester and/or other components of the wirelessly powered device.

In some examples, passive backscatter transmitters, such as backscatter transmitter 128, may be powered by incident energy transmitted by a multiple antenna system (e.g., by transmitter 112). This may create a newer dependence of the backscatter reflection coefficient, and accordingly, the backscatter transmitter 128 may be a nonlinear device.

Device electronics, such as device electronics 132, may generally be implemented using any electronics that may receive some and/or all of their power from power harvesters, such as power harvester 130. Examples of device electronics 132 include, but are not limited to, one or more processor(s), circuits, batteries, displays, speakers, sensors, communication components, etc.

During operation, systems described herein may transmit wireless power signals from a multiple antenna system to a wirelessly powered device. The wirelessly powered device may backscatter a portion of the wireless power signals to provide a backscatter signal. The backscatter signal may be received by the multiple antenna system and used to provide an estimate of a channel information between the multiple antenna system (e.g., a transmitter of the multiple antenna system) and the wirelessly powered device.

Figure 2:
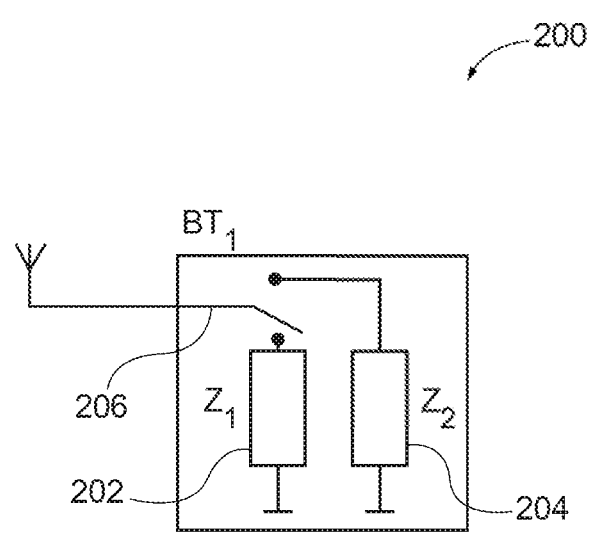
FIG. 2 is a schematic illustration a backscatter transmitter 200 in accordance with examples described herein.

FIG. 2 is a schematic illustration of a backscatter transmitter arranged in accordance with examples described herein. The backscatter transmitter 200 includes impedance 202, impedance 204, and switch 206. Additional, fewer, and/or different components may be used in other examples. In some examples, the backscatter transmitter 200 may be used to implement the backscatter transmitter 128 and/or backscatter transmitter 122 of FIG. 1.

The switch 206 may be used to couple different impedance values to an antenna. Switch 206 may be implemented, for example, using one or more transistors or multiplexors.

Two impedances—impedance 202 and impedance 204—are shown in FIG. 2 however any number of impedances may be used, including 2, 4, 8, 16, or another number of impedance values. In some examples, multiple impedances may be presented by simply opening or closing a switch, such as switch 206, and separately identified impedance elements may not be provided. The impedance 202 and impedance 204 may be implemented using any components providing an impedance, such as, but not limited to, one or more resistors, capacitors, inductors, or other elements.

In some examples, modulators may be provided which may allow the backscatter transmitter 200 to perform amplitude and/or phase modulation. Modulation may allow data to be encoded in the backscatter signal, including but not limited to an identification of the backscatter transmitter, a power level of the wirelessly powered device, a power need of the wirelessly powered device, or other data. In some examples, the data may be indicative of power harvester characteristics of the power harvester and/or other components of the wirelessly powered device.

Figure 3:
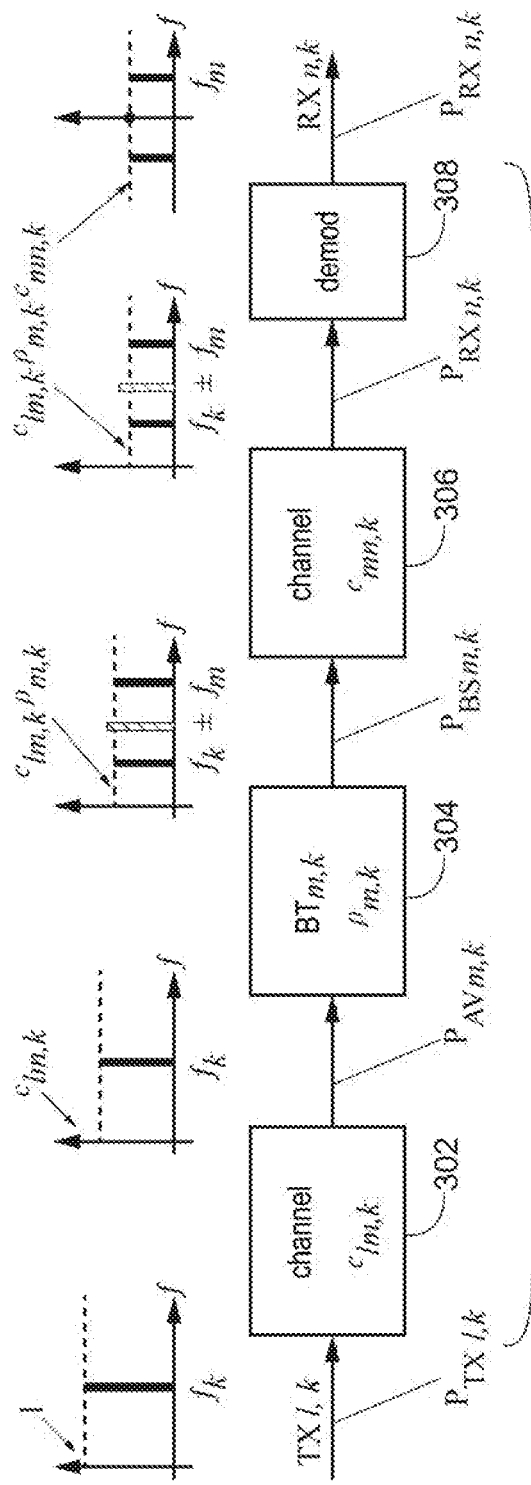
FIG. 3 is a schematic illustration of a signal model for a system arranged in accordance with examples described herein.

FIG. 3 is a schematic illustration of a signal model for a system arranged in accordance with examples described herein. The signal model shown in FIG. 3 may be representative of the operation of the system 100 of FIG. 1 in some examples. The model in FIG. 3 includes channel 302, backscatter transmitter 304, channel 306, and demodulator 308. Additional, fewer, and/or different components may be used in other examples. During operation, signals may be provided from a multiple antenna system (e.g., including transmitter 112 of FIG. 1) through channel 302 to a wirelessly powered device having a backscatter transmitter, such as backscatter transmitter 304. The backscatter transmitter 304 of FIG. 3 may be implemented, for example, using the backwater transmitter 128 of FIG. 1 of wirelessly powered device 118. The backscatter transmitter 304 may provide a backscatter signal through channel 306 to a receiver (e.g., receiver 116 of FIG. 1). The demodulator 308 of FIG. 3 may be provided in a receiver described herein (such as in the receiver 116 of FIG. 1).

Mathematical representations of the various signals acted upon by models of the various components in FIG. 3 are described herein. The mathematical representations are provided to facilitate understanding of the subject matter, and are not intended to be limiting of all examples. It is to be understood that practical implementations of systems described herein may vary from the theoretical mathematical representations.

In complex baseband representation, a carrier at frequency $f_k$ which is provided by transmitter $TX_l$ (e.g., transmitter 112 of FIG. 1) and which is reflected by a backscatter transmitter $BT_m$ (e.g., by backscatter transmitter 128 of FIG. 1) to receiver $RX_n$ (e.g., receiver 116 of FIG. 1) can be considered to be attenuated by the complex backscatter channel gain of channel 302, differential backscatter reflection coefficient of backscatter transmitter 304, and channel gain of channel 306, shown modeled in FIG. 3 c, p, and c, respectively. Considering l transmitters in a multiple antenna system, m number of backscatter transmitters, and n receivers, the complete set of channel gains may be written as $C_{lm,k} P_{m,k} C_{mn,k} \in C$, Where $C_{\ldots,k} \in C$ are the channel gains and $p_{,k} \in C$ is the differential backscatter reflection coefficient or backscatter gain. $\in C$ denotes "element of complex numbers". The overall backscatter channel gains for a system with L transmitters and N receivers form a matrix $$B_{m,k} = \begin{bmatrix} c_{1m,k} p_{m,k} c_{m1,k} & \cdots & c_{Lm,k} p_{m,k} c_{m1,k} \\ \vdots & \ddots & \vdots \\ c_{1m,k} p_{m,k} c_{mN,k} & \cdots & c_{Lm,k} p_{m,k} c_{mN,k} \end{bmatrix} \quad (1)$$

where each row represents a transmitter in a multiple antenna system and each column represents a receiver in the multiple antenna system (e.g., the system 100 of FIG. 1 may be a 2×2 matrix with rows for transmitter 112 and transmitter 106 and columns for receiver 116 and receiver 110). Multiple frequencies and backscatter transmitters may form additional dimensions in this matrix ($B_{m,k} \forall m,k \rightarrow B$). $\forall m,k$ refers to "for all m and k". For example, the matrix (1) may correspond to the backscatter transmitter 128 of FIG. 1. An additional dimension of the matrix (1) may correspond to the backscatter transmitter 122 of FIG. 1, which may contain an additional 2×2 values.

Note that the gains reflected in matrix (1) incorporate linear and nonlinear effects between the transmitters and the receivers, including the backscatter transmitters, multipath propagation channels, antenna gain patterns, cable losses, filtering, nonlinearities of the transmitters' power amplifiers, as well as various inaccuracies and time variances. B may therefore be considered a complete description of the backscatter channel(s). Transmitters and receivers may be assumed in some examples to be phase synchronized, which may be implemented in some examples using a homodyne setup or through phase locked loops with a common reference. Since modulation and demodulation are inverse operations in complex baseband, the frequency conversion introduced by the backscatter modulation may be ignored in some examples. This may utilize a narrowband assumption, which may be met in some examples by providing the wirelessly powered device's backscatter modulation frequency below the coherence bandwidth of the channel, which may be in the range of several MHz for typical indoor channels in the UHF bands.

Examples of multiple antenna systems described herein may provide wireless power signals for providing power to one or more wirelessly powered devices. In some examples, characteristics of the wireless power signals (e.g., amplitude, phase, frequency, and/or waveform) are selected to provide a desired level of power to the wirelessly powered device (e.g., to optimize power delivery). Accordingly, controllers in the multiple antenna system (e.g., controller 114 of FIG. 1) may select wireless power signals in accordance with a cost function selected to provide the desired power level.

For example, each transmitter of a multiple antenna system (e.g., the transmitter 112 and transmitter 106 of FIG. 1) may have the ability to control amplitude and phase of each frequency component it transmits. The complex amplitude of the k-th frequency component sent by a transmitter $TX_l$ may be written $_{al,k} \in C$. For notational convenience all transmitter gains for all frequencies may be shown in one matrix, $$A = \begin{bmatrix} a_{1,1} a_{2,1} & \cdots & a_{L,1} \\ \vdots & \ddots & \vdots \\ a_{1,K} & \cdots & a_{L,K} \end{bmatrix} \quad (2)$$

The goal for multiple antenna systems described herein may be to optimize the available power to the WPDs, in a system. The available power may be expressed as $P_{AV}$. It may be desirable for the multiple antenna system to optimize (and/or provide a desirable level of) available power without using a measurement of the power level taken at the WPD, or any other measurement that requires active participation of the WPD. Instead, a received backscatter signal may be used.

Note that the power-bearing signal incident at the WPD may be considered the sum of all transmitted signals multiplied with the corresponding channel gains. By introducing the frequency dependent efficiency of the WPDs RF energy harvester or harvester characteristic, $f_{harv,m}$, the total available power at the WPD may be written as:

$$P_{AVm} = f_{harv,m}\left(\sum_{l=1}^{L} a_{l,k} c_{lm,k}\right), \quad (3)$$

For an ideal uniform wideband power harvester, the harvester characteristic may be expressed as $f_{harv,m}(\cdot) = \sum_{k=1}^{K} |\cdot|^2$. relationships may be used in other examples. The harvester characteristic describes the available or "harvested" power at the wirelessly powered device (WPD) for a given RF input signal (e.g., "incoming power"). This characteristic may be related to the efficiency of the power harvester and may depend on the type of power harvester. An ideal harvester characteristic may be to convert 100% of the incoming signal to usable output power ("DC"), as shown for the uniform wideband power harvester example above. Generally, the harvester characteristic may be expressed as a function or model in the mathematical sense. The harvester characteristic may be static or dynamic, and may allow for training. By means of an example, a typical diode harvester may have a "hill-shaped" conversion efficiency curve with low efficiency at low incoming signal levels, a peak efficiency fl somewhere in the middle, and then dropping efficiency and ultimately damage for high incoming signal levels. Power-optimized waveforms (POWs) may be designed to improve efficiency at low signal levels by creating peaks that reach into the high efficiency range. The total available power at a WPD, $P_{AV}$, can be directly influenced by tuning $a_{l,k}$ and can thus be optimized if $P_{AV}$ is known. However, that approach may undesirably utilize a measurement of the incident power at the backscatter transmitter. In some examples, intimation about the harvester characteristic used in a wirelessly powered device may be encoded in a backscatter signal provided by the wirelessly powered device. The information may be stored in a location (e.g., memory) accessible to the wirelessly powered device, including integrated in the wirelessly powered device. In some examples, the information may be provided by operation of the harvester of the wirelessly powered device.

Accordingly, controllers, system control elements, or other processors described herein may use a model of a harvester characteristic of the wirelessly powered device to control an amount of power transferred to the wirelessly powered device by the wireless power signal.

In some examples, the harvester characteristic (and/or the model of the harvester characteristic) may change and/or be updated over time. In some examples, the changes anchor updates may be made based on the performance of the harvester during operation of the system. In some examples, controllers, system Control, or other processor elements may update the model of the harvester characteristic based on observations of the power level of the wirelessly powered device.

The controller may utilize one or more models associated with one or more wirelessly powered devices. For example, each wirelessly powered device (e.g., each harvester included in a wirelessly powered device) may have a model associated with it that may be different, and may be maintained, used, and/or updated differently. Some wirelessly-powered devices may be associated with multiple models.

Examples of system described herein utilize backscatter signals received at multiple antenna systems (e.g., at receiver 116 of FIG. 1) to adjust (e.g., optimize) wireless power signals provided by the multiple antenna system (e.g., by transmitter 112 and transmitter 106 of FIG. 1). Backscatter signals at the receiver may be used, as opposed to signals incident at the WPD, which may reduce power and complexity requirements at the wirelessly powered devices. Following the same steps as above, these backscatter signals may be represented as the signal at the WPD multiplied with the WPD's backscatter gain $p_{m,k}$ and the return link channel gains $C_{mn,k}$.

If the general harvester characteristics are known the WPD's harvesting behaviors $f_{harv,(\cdot)}$ may be mirrored using signal processing at the receiver. the receiver combination function $f_{rx(\cdot)}$ and the device combination function $f_{wpd(\cdot)}$ may be used to condense the signals at all receivers and frequencies into one signal that can be used for the backscatter-based optimization, $$P_{RX} = f_{\overline{wpd}}\left(f_{\overline{rx}}\left(f_{\overline{harv,m}}\left(\sum_{l=1}^{L} a_{l,k} c_{lm,k} p_{m,k} c_{mn,k}\right)\right)\right). \quad (4)$$

$P_{RX}$ refers to the backscatter signal provided by one or more wirelessly powered devices received over the channels from the wirelessly powered devices to the multiple antenna system.

Generally, the harvester characteristic may depend on the type of harvester on the wirelessly powered device. Examples described herein may model the harvester characteristic based on a known energy harvester structure in some examples. For example, one or more of the controllers, MIMO system units, and/or system control elements of FIG. 1 may implement a model of one or more harvester characteristics based on circuit components and topology used to implement one or more harvesters in wirelessly powered device. Such a model may be parametrized and refined over time through machine learning or other learning techniques. In other examples, a harvester characteristic may be selected by a user or other predetermined process. For example, if an ideal linear harvester characteristic were chosen, then the system may treat the WPD as ideal linear harvester. Such an ideal model may also be used in examples where the harvester characteristic is initially unknown. Again, over time one or more controller and/or system control element may refine the harvester characteristic based on data obtained during operation and/or testing of systems described herein.

Optimizing the received power $P_{RX}$ at the multiple antenna system (e.g., base station) may in turn optimize the incident power for a linear backscatter device due to the dependence between both power levels. This notion may also be extended to nonlinear backscatter devices in some examples. Building on that interdependence of power levels, the different combination functions introduced above allow for a variety of different cost functions and optimization targets.

For simple power maximization of all WPDs, the following function can be used, with $f_{rx(\cdot)}$ and $f_{wpd(\cdot)}$ being sums and $f_{harv,m(\cdot)}$ chosen according to the harvesting characteristics of the backscatter transmitters involved. The optimization may be subject to total power constraints $\Sigma P$ and spectral constraints $P(f)$.

$$\operatorname*{argmax}_{A} \sum_{m=1}^{M} \sum_{n=1}^{N} f_{\overline{harv,m}}\left(\sum_{l=1}^{L} a_{l,k} c_{lm,k} p_{m,k} c_{mn,k}\right), \quad (5)$$

WPT power minimization can be achieved by searching for argmin. Other desired power levels may be achieved by seeking to set the above expression equal to a desired value or to fall within a desired range, or by choosing different cost functions. Note that for nonlinear backscatter devices all transmitters and frequency components may have to be optimized jointly, as superposition may not hold.

Accordingly, values of A may be found which maximize the above expression (total power available at the receivers). Accordingly, controllers of multiple antenna systems described herein (e.g., controller 114 and controller 108 of FIG. 1) may be used to evaluate signal amplitudes of wireless power signals to be transmitted by associated transmitters, and may select and/or adjust those signal amplitudes to maximize the total received backscatter power in accordance with equation (4) or equation (5)—e.g., based on the forward channel gain, backscatter gain, reverse channel gain, and/or the harvester characteristics. Rather than maximize, in other examples, amplitude, phase, and/or waveforms may be selected which result in the received backscatter power having a particular desired value or falling within a desired range.

A variety of techniques may be used by controllers described herein to provide signal amplitudes, phases, and/or waveforms of wireless power signals for multiple transmitters which result in the desired power level. Examples of mathematical manipulations that explain examples of how to evaluate this expression are provided herein, but are not intended to be limiting. In some examples, a closed-form solution of the optimization of equation (5) may exist for narrowband power transfer maximization to a single device $WPD_1$. This may be equivalent to optimizing the incident power at $WPD_1$ (e.g., at the wirelessly powered device 120 of FIG. 1) for a given frequency $f_k$, $$P_{AV1,k} = \left|\sum_{l=1}^{L} a_{l,k} c_{l1,k}\right|^2. \quad (6)$$

The corresponding optimization problem $$\operatorname*{argmax}_{a_{l,k} \forall l} \left|\sum_{l=1}^{L} a_{l,k} c_{l1,k}\right|^2 \quad \text{s.t.} \ \Sigma P, P(f), \quad (7)$$

may be equivalent to maximum ratio combining (MRC), with the solution being expressed as $$a_{l,k} = c^*_{l1,k},$$

where * denotes the complex conjugate. When multiple frequencies $f_k$ are used (e.g., by transmitter 112 and/or transmitter 106 of FIG. 1), the frequency with the largest singular value of the channel gain vector $[C_{11,k}\ C_{21,k}\ \ldots\ C_{L1,k}]$ may be selected.

A more generic solution of this problem for multiple WPDs and multiple frequencies may be expressed as $$\underset{A}{\mathrm{argmax}} \sum_{m=1}^{M} \sum_{k=1}^{K} \left| \sum_{l=1}^{L} a_{l,k} c_{lm,k} \right|^2 \quad \text{s.t., } \Sigma P, P(f), \quad (9)$$

also allowing power transfer minimization via argmin, may be provided by singular value decomposition (SVD) of the channel gain matrix $$C_k = \begin{bmatrix} c_{11,k} & \cdots & c_{L1,k} \\ \vdots & \ddots & \vdots \\ c_{1M,k} & \cdots & c_{LM,k} \end{bmatrix} \quad \forall k = 1 \ldots K, \quad (10)$$

or the backscatter channel gain matrix $B_k$.

Accordingly, in examples described herein, controllers (e.g., controller 114 and/or controller 108 of FIG. 1) may select and/or adjust characteristics of wireless power signals to be transmitted in part by selecting a right-singular vector corresponding to the largest singular value over all $f_k$ for power transfer maximization and one of the zero singular values for minimization.

The result provided by the SVD may be equivalent to optimizing the average power delivered to all M transponders. Other cost functions which may provide more control and/or mixed optimization (e.g., different cost functions for different transponders) may also be used by controllers described herein in some examples.

The above described evaluation (e.g., optimization) can be solved readily if the channel gains are known. However, it may not be possible to fully and unambiguously decorrelate the backscatter gain matrix due to phase wrapping of the multiplicative terms in (1) in some examples. It may, however, be possible to obtain ambiguous estimates of the channel gains that are fully sufficient for operation of systems described herein. These estimates may also be used for power-optimized waveforms in some examples.

To estimate complex channel gains, consider an assumption that all transmitters transmit concurrently on all sub-carriers k. Concurrent transmission is only assumed to facilitate understanding of the subject matter, and is not intended to be limiting of all examples. Concurrent transmission may be used for nonlinear backscatter transponders and linear backscatter transponders in some examples. Concurrent transmission may be used for nonlinear backscatter transponders. Under the above assumption of concurrent transmission, the incident signal at the m-th WPD may be expressed as $$s_{AVm} = \sum_{l=1}^{L} \sum_{k=1}^{K} a_{l,k} c_{lm,k} s_{TXl,k}, \quad (11)$$

with $s_{TXl,k}$ being the transmit signal of $TX_l$ (e.g., transmitter 112 of FIG. 1) at frequency $f_k$. The incident signal $s_{AVm}$ may be subsequently backscattered by $WPD_m$ (e.g., backscatter transmitter 122 of FIG. 1). The signal observed by $RX_n$ (e.g., receiver 116 of FIG. 1) may be expressed as $$s_{RXmn,k} = c_{mn,k} p_{m,k} \sum_{l=1}^{L} \sum_{k=1}^{K} a_{l,k} c_{lm,k} s_{TXl,k}. \quad (12)$$

In some examples, the signals at $RX_n$ (e.g., receiver 116 of FIG. 1) may be divided by the signal at $RX_1$ (e.g., receiver 110 of FIG. 1) for each frequency component. Note that, generally, the receiver in a system having the strongest received signal may be selected as the reference, which may improve and/or maximize the SNR of the estimates of the channel information (e.g., estimates of channel gains). This may fully or partially cancel out the backscatter gains and the sums, and only the return link gains remain. This may be expressed as:

$$s_{RXmn,k}/s_{RXm1,k} = C_{mn,k}/C_{m1,k} \quad 13$$

and thus the estimated channel gains for each frequency component may be expressed as $$C_{m,k} = 1/C_{m1,k} [C_{m1,k} C_{m2,k} \ldots C_{mN,k}] \quad 14$$

Accordingly, examples of controllers described herein may divide a received backscatter signal at various receivers (e.g., at various antennas and/or MIMO units) by a received backscatter signal at a particular one of the receivers (e.g., generally the strongest received backscatter signal) to obtain an estimate of channel information (e.g., an estimate of channel gain). The estimated channel gains may be used by the controllers to select and/or adjust wireless power signal characteristics, for example using equations (5), (8) or (9). The remaining common gain factor $1/C_{m1,k}$ may not affect power delivery and may be neglected. Note that any non-linearity of the backscatter gain factor may be automatically taken into account using this approach, since $p_{m,k}$ is canceled out during the process. The method thus may find use with generally any linear or nonlinear backscatter transponder.

In some examples, rather than dividing the entire signal at one receive by a received signal at another receiver, the ratio may be calculated for individual frequency components and/or ranges. Such an approach may be used, for example, to provide desirable power-optimized waveforms.

In some examples, this technique may also be applied to equalize wideband signals such as power-optimized wave forms (POWs). Instead of dividing the signals at multiple receivers, ratios of the individual frequency components may be used. Again, the sums in (12) will cancel. In these examples, however, the transponder gain may not cancel out completely. At $RX_n$ it may be expressed as $$s_{RXmn,k}/s_{RXmn,1} = c_{mn,k}/c_{mn,1} \cdot \frac{p_{m,k}}{p_{m,1}} \quad (15)$$

and $$\hat{c}_{mn} = 1/c_{mn,1} \cdot \left[ c_{mn,1} \cdot \frac{p_{m,1}}{p_{m,1}} c_{mn,2} \cdot \frac{p_{m,2}}{p_{m,1}} \cdots c_{mn,N} \cdot \frac{p_{m,k}}{p_{m,1}} \right] \quad (16)$$

The remaining transponder gain ratios $p_{m,k}/p_{m,1}$ may create a bias in these wideband examples. If the backscatter transmitter gain is relatively flat over the occupied bandwidth $f_1 \ldots f_K$, i.e., $p_{m,k} \approx p_{m,I} \forall k$ then this method may result in an unbiased estimate of the channel gains. As above, the common gain factor $1/c_{mn,I}$ may be irrelevant for the purposes of using the channel gains to adjust and/or provide wireless power signal characteristics for transmitters.

Accordingly, in some examples, taking a ratio of the received backscatter signal at one receiver of a multiple antenna system with the received backscatter signal at another receiver of the multiple antenna system (e.g., at a receiver receiving the maximum received backscatter signal of all transmitters in the system) may provide an estimate of channel information between the wirelessly powered device providing the backscatter signal and the transmitter associated with that receiver. The estimate may be particularly accurate in narrowband examples (e.g., where the frequency of the backscatter transmitter modulation is less than the coherence bandwidth of the channel and where the backscatter transmitter may have a gain that is flat over the signal bandwidth). The estimate may be sufficiently accurate in wideband examples (e.g., where the frequency of the backscatter transmitter modulation may not be less than the coherence bandwidth of the channel and/or where the backscatter transmitter may have a gain that is not completely flat over the signal bandwidth). Controllers described herein may utilize the estimate of channel information (e.g., channel gains) to adjust and/or provide characteristics of wireless power signals that may improve and/or optimize power transfer from the multiple antenna system to one or more wirelessly powered devices.

For example, channel information may be used (e.g., by one or more controllers and/or system control) to calculate the transmitter gains for one or more transmitters in a multiple antenna and/or multiple frequency system. The methodology used to calculate the transmitter gains may be based on the desired goals of the system —a variety of cost functions or other expressions may be used to optimize and/or select particular performance for the system. A simple solution which may maximize linear power delivery to multiple (e.g., all) WPDs in a system may be to have the controller and/or system control calculate the singular value decomposition (SVD) of the estimated channel gain matrix and select the right-singular vector associated with the largest singular value. More complex and/or different optimization or target goals can be reached through numerical optimization or other techniques.

Accordingly, systems described herein may estimate channel information (e.g., channel gains) from a backscatter signal received from one or more wirelessly powered devices. Having an estimate of the channel information provides the system (e.g., multiple antenna or multiple frequency systems described herein) control over the channel and thus a method to optimize and/or control wireless power transfer. Cost functions or other optimization and/or desired targets for the wireless power signals may be calculated by controllers either integrated with the multiple antenna system and/or external and in communication with the multiple antenna system. The desired characteristics of the wireless power signals (e.g., amplitudes, phases, frequencies, and/or waveforms) may then be communicated to the controllers and/or transmitters such that, together, tale collection of transmitters provides wireless power signals which deliver the targeted and/or optimized power to the wirelessly powered devices.

In some examples, multiple frequency systems may operate in analogous manner to carrier hopping systems. This may be because the optimal strategy for narrowband wireless power transfer over multiple carriers with constant total transmit power may be to allocate the majority (e.g., all) power to one carrier within the available bandwidth. Consequently, the multiple-frequency system may only use a single carrier out of K options. This may be analogous to carrier hopping, but with an optimal choice for the selected frequency. The underlying randomness and time-variance of the channel may promote and/or ensure that different transmitters and/or different systems may choose different optimal carriers and that each system may have to re-evaluate its carrier selection frequently.

In some examples, rather than provide power maximization or minimization, as discussed herein, examples of controllers described herein may jointly determine (e.g., maximize) the power transfer to one group of WPDs while at the same time determining in a different manner (e.g., minimizing) the power transfer to another group of WPDs. So for example, controllers described herein could select characteristics of wireless power signals transmitted by multiple transmitters such that one or more wirelessly powered devices are presented with one level, range, maximum or minimum power amount while another one or more wirelessly powered devices are presented with a different level, range, maximum or minimum power amount. Another example is the maximization of the smallest power level in a group instead of the total power. This may be useful if a certain minimum amount of power is needed for a given operation that should be performed by all WPDs. WPDs with excess incident power typically dissipate or reflect the excess power anyway, so by targeting the minimum power level instead of the total amount of power for the group a larger number of WPDs can perform a given operation. The varying strategies for targeting the power levels of the wireless power signals may be implemented by choosing different functions for $f_{wpd(\cdot)}$, $f_{rx(\cdot)}$, and $f_{harv,m(\cdot)}$, see equation 5) and using optimization to evaluate $$\underset{A}{\mathrm{argmax}} f_{\overline{wpd}}\left(f_{\overline{rx}}\left(f_{\overline{harv,m}}\left(\sum_{l=1}^{L} a_{l,k}\hat{c}_{ln,k}p_{m,k}\hat{c}_{mn,k}\right)\right)\right) \quad (17)$$

s.t., $\Sigma P$, $P(f)$, where C are the estimated channel gains. Optimization may be performed iteratively or as a closed-form solution either offline, e.g., in software only excluding the hardware or online, e.g., by applying intermediate steps to the wireless power transfer system and measuring intermediate results.

Accordingly, examples of controllers and/or other processor or system control elements described herein may adjust wireless power signals iteratively. Iterative adjustment may be achieved by applying initial adjustments, then calculating further adjustments based on models of the wirelessly powered device, the receiver, the harvester, or combinations of those components, and applying the further adjustments to the wireless power signal. The further adjustments may or may not be calculated by the same component controlling and/or making the adjustments.

In another example, controllers and/or other processor or system control elements described herein may adjust wireless power signals without applying initial and iterative adjustments to the wireless power signal. Adjustment may be achieved by calculating all adjustments based on models of the wirelessly powered device, the receiver, the harvester, or combinations of those components, and applying the calculated final adjustments to the wireless power signal. Adjustments may be calculated iteratively, e.g., by numerical optimization, or may be calculated by mathematical formulas, e.g., a closed-form solution, or may be retrieved from any storage system. Further adjustments may be applied to the wireless power signal after applying the calculated adjustment to the wireless power signal. The further adjustments may or may not be calculated and applied by the same component controlling and/or making the adjustments.

The above example of maximizing the smallest power level in a group can for example be achieved by $f_{\overline{wpd}}(\bullet):=\min(\bullet)$, e.g. selecting the WPD with the minimum available power level for the optimization. $f_{\overline{wpd}}(\bullet):=\min(\bullet)$ refers to providing a WPD combination function as the "select minimum" function. Accordingly, the smallest value of all WPDs may be passed along to the calculation of wireless power signals. Thus the signal calculation (e.g., optimization) may target the WPD with the smallest power level.

Other possible examples are to model $f_{\overline{harv,m}}(\bullet)$ according to a WPD's power harvesting characteristics, thus finetiming the optimization to specific types of WPD, or weighting received signals with better SNR by choosing $f_{\overline{rx}}(\bullet)$ accordingly.

In some examples, the harvester characteristic (and/or the model of the harvester characteristic) may change and/or be updated over time. In some examples, the changes and/or updates may be made based on the performance of the harvester during operation of the system. In some examples, controllers, system control, or other processor elements may update the model of the harvester characteristic.

Examples described above may be used themselves as described and/or in any combination.

The different functions such as the receiver combination function $f_{\overline{rx}}(\bullet)$, and the wirelessly powered device combination function $f_{\overline{wpd}}(\bullet)$ may be used to formulate a single cost function that can be solved or otherwise used to select values (e.g., amplitude, phase) for use by multiple antennas and/or frequencies in a MIMO system. In some examples, it may be desirable to maximize power to one wirelessly powered device and minimize power delivered to another.

Weighted cost functions or weight functions may be used to assign different importance to different optimization goals. Weights may be modified over time to reflect changes in priorities. Moreover, WPDs may be added or removed dynamically from the optimization cost function. For example, a WPD may be added to the maximization pool with high priority. Accordingly, optimization weights may be used by a controller in accordance with the relative importance of a goal for each wirelessly-powered device. The weights may be predetermined. For example, for a given type or identity of wirelessly powered device, a weight may be assigned and communicated to the components performing the calculation of the wireless power signals.

Examples described herein can also be used with power-optimized waveforms (POWs). For example, one or more wireless power signals may be implemented using POWs. POWs generally refer to signals having waveforms selected to be advantageous to the power harvester of a WPD. For example utilizing diode harvesters, waveforms with large peak-to-average power ratio and fast repeating peaks may be used, as they may be rectified with higher efficiency than CW signals. In order to achieve this goal, POWs may use bandwidths exceeding the coherence bandwidth of the channel. The resulting decorrelation of the subcarriers at the WPD may make the POW ineffective by the time it passed through the wireless channel. Phase/amplitude control at the transmitter(s) (e.g., tinder the control of one or more controllers) can be used to promote acid or ensure constructive interference of the multiple carriers at the WPD. Accordingly, controllers described herein may be used to adjust the phase and/or amplitude of POWs used as wireless power signals such that the POWs constructively interfere at one or more wirelessly powered devices, which may offset, wholly or partially, effects of the channel.

In some examples, optimizing the phase/amplitude control at the transmitter can either be done using optimization as discussed herein or by using estimated channel gains as discussed herein. In some examples, by pre-distorting the wireless power signals with $1/\hat{c}_{l_m,k}$ (see Equation 16), the desired POW may be wholly or partially re-constructed at the WPD. POW optimization can also be combined with the multi-transmitter WPT optimization to optimize POWs sent out by multiple transmitters.

A variety of applications may benefit from wireless power transfer systems described herein. For example, systems, such as system 100 of FIG. 1, may be implemented in an indoor multipath environment. The MIMO system units (e.g., MIMO system unit 102 and MIMO system unit 104) may be distributed about an environment, such as an office, an office floor, and/or an office building. Wirelessly powered devices (e.g., phones) may be charged while present in the environment. Techniques described herein to adjust wireless power signals may be used to select ones of the MIMO system units that may contribute to wireless charging of a particular device based on that unit's ability to do so as indicated in the channel information which may be estimated for the channel. For example, transmitters may only be used to provide wireless power signals to a particular wirelessly powered device if the channel information for the channel between a particular transmitter and the wirelessly powered device indicates that power transfer efficiency between the two is above a threshold value.

Wireless power transfer systems, such as system 100 of FIG. 1, may be also be implemented in outdoor environments. Optimization techniques described herein may be used to control the wireless power signals transmitted by the transmitters in outdoor environments using the channel information from each of the transmitters to the wirelessly powered devices for optimization in an analogous manner as described to an indoor environment.

Positions of the wireless power transmitters and wirelessly powered devices may be arbitrary. Transmitters or WPDs may be distributed randomly in an environment, form an array, multiple arrays with arbitrary locations, or any combination of the above.

In some examples, the wireless power signals may be adjusted based on information contained in the backscatter signal. Recall the backscatter signal may in some examples be encoded with data such as identification of the wirelessly powered device, power level and/or power need of the wirelessly powered device. The wireless power signals provided by various transmitters may be determined based on that data. For example, the data may indicate that the object is not in need of power or should not receive power (e.g., based on the ID), accordingly, the power transfer scheme could be adjusted to avoid directing power toward a backscatter transmitter associated with that ID.

In some examples, the techniques described herein to adjust wireless power signals may be used to precisely target the delivery of wireless power signals. In some examples, power may be delivered by a multiple antenna system to a particular location within centimeter resolution in some examples, tens of centimeters in other examples, or another range. In this manner, using channel information estimated from backscatter signals, power may be targeted at a particular region (e.g., to charge a medical device in one region of a human, but not charge other areas of the human).

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

EXAMPLE

Examples of systems described herein were implemented and characterized. Wireless channel data used for the performance evaluations was recorded using an Agilent E5062A vector network analyzer (VNA) with calibration up to the antenna ports. The term "transmitters" below refer to co-located power transmitters and receivers ($TX_1=RX_n$) and "receivers" refer to WPD positions $WPD_m$. (The terms "transmitters" and "receivers" are used solely from the perspective of the wireless propagation channel.) Omnidirectional ultra-wideband patch antennas were used both for transmitters and receivers and positioned at two different heights, z=1.72 m for even numbered transmitters ($TX_{4,6,10,12}$) and z=0.75 m for odd numbered transmitters ($TX_{3,5,9,11}$). The receivers formed horizontal planes at two different heights, z=0.75 m and 1.72 m, with an average grid spacing of 20 cm in x and y. The area covered by each receiver plane was approximately 50 $m^2$, with direct path lengths ranging front 48 cm to 25.2 m, and with both line-of-sight (LOS) and non-line-of-sight (NLOS) conditions. In total, channel information (e.g., MIMO channel transfer functions (CTFs)) were recorded between 8 transmitter positions and 3012 WPD locations in a frequency range of 0.1-3 GHz with 2 MHz step size. The measurement noise floor was approximately 115 dB. Backscatter channels were been calculated in post-processing by multiplying CM of forward and return link channel, adding tag gains from UHF RFID device models or using i.i.d. circulant symmetric uniform complex random variables with $|\rho m,k|<1$ for different analyses.

Wideband statistics for the wireless channel during the measurements were calculated. The channel showed predominantly NLOS characteristics in terms of power, with LOS K-factors between −35 and +5 dB. The K-factor PDF is multimodal and shows two groups of characteristics: a peak around −5 dB for channels with a clear optical line-of-sight, and a second bump around −20 dB created by channels with blocked LOS to the transmitters. Only about 2% of the channels have a dominant line-of-sight component ($K_{LOS}>0$). RMS delay spreads reached 60 ns in the measurements, with the median being around 30 ns. Observed 70% coherence bandwidths start at 2 MHz and reach a few hundred MHz. It follows that significant variations of the channel gains can be expected even within in the U.S. industrial scientific and medical (ISM) band of 902-928 MHz. The coherence distance, which is related to the angular spread of the multipath components, was relatively low for these measurements due to the omnidirectional antennas. The majority of observed 70% coherence distances lay around 11 cm (a third of the wavelength 4904 MHz); almost all values are smaller than 33 cm (one wavelength). Thus, for a displacement of 11 cm, 70% or less correlation remained to the original position for half of the measured channels. For a displacement of 33 cm, all of the channels would show less than 70% correlation to the original position.

Example channel impulse responses were determined for LOS and for NLOS conditions. The building used to host the multiple antenna system was an office lab environment, and showed relatively light but dense multipath propagation. There were distinctive peaks in both plots which are caused by large natural reflectors in the environment—a window bay with coated RF-reflective glass and metal elevator doors.

Nonetheless the line-of-sight was the dominant multipath component for the LOS case. The low K-factors observed were caused by the denseness of the CIRs and thus by the sheer amount of indirect paths, not their relative strength.

Results were generated for the 902-97 MHz band for this proof of concept implementation, however, other frequency bands may be used in other examples For a single wirelessly powered device and K=13 carriers, for example, the measured median wireless power transfer (WPT) gain for the 8-transmitter system is 11.9 dB, approximately 2.3 dB above the gain for carrier hopping. This gain drops in case of multiple WPDs, but always stays above the WPT gain for single frequency optimization.

Results for POW equalization were obtained for a 4-POW with 28 MHz bandwidth and 914 MHz center frequency roughly covering the U.S. 902-928 MHz ISM band. Backscatter gains were taken from a measurement-verified model of an NXP G2XM based wireless powered device (e.g., tag). The tag's phase changes by 34° within the given bandwidth, which should represent a significant bias. Without equalization, the median peak-to-average power ratio (PAPR) at the tag dropped from 8 for the ideal 4-POW to 6.2, and the 10% quantile dropped to 4. Given the nonlinear characteristics of diode harvesters, this drop represents a significant power loss. For comparison, with completely uncorrelated channel gains (worst case), the median PAPR drops to 4.2. Equalization using Equation 16 increases the median PAPR to 7.99, and the 10% quantile to 7.8 for high SNR. Accordingly, efficient channel equalization for multi-carrier POWs is possible for off-the-shelf passive UHF RFID transponders and other linear and nonlinear backscatter WPDs despite the bias introduced by the non-ideal backscatter gains.

What is claimed is:

1. A device comprising:
   at least one transmitter configured to provide a wireless power signal to at least one wirelessly powered device using multiple antennas, multiple frequencies, or combinations thereof;
   at least one receiver configured to receive backscatter signals from the at least one wirelessly powered device; and
   a controller configured to estimate channel information for the channels between the at least one of the wirelessly powered device and at least one of the multiple antennas based on the backscatter signals, wherein the controller is configured to adjust the wireless power signal iteratively at least in part by;

applying initial adjustments to the wireless power signal;
calculating further adjustments based on models of the wirelessly powered device, the transmitter, the receiver, or combinations thereof; and
applying the further adjustments to the wireless power signal.

2. The device of claim 1, wherein the controller is further configured to use the channel information in part to provide a desired data rate, signal-to-noise ratio, or combination thereof.

3. The device of claim 1, wherein the controller is configured to use the channel information to adjust the at least one receiver.

4. The device of claim 1, wherein the controller is configured to adjust a phase, an amplitude, or both of the wireless power signal based on the estimate of the channel information to control an amount of power transferred to the wirelessly powered device by the wireless power signal.

5. A device comprising:
at least one transmitter configured to provide a wireless power signal to at least one wirelessly powered device using multiple antennas, multiple frequencies, or combinations thereof;
at least one receiver configured to receive backscatter signals from the at least one wirelessly- powered device; and
a controller configured to estimate channel information for the channels between the at least one of the wirelessly powered device and at least one of the multiple antennas based on the backscatter signals, wherein the at least one transmitter comprises a plurality of transmitters dispersed in an environment, each of the plurality of transmitters coupled to at least a respective one of the multiple antennas.

6. A device comprising:
at least one transmitter configured to provide a wireless power signal to at least one wirelessly powered device using multiple antennas multiple frequencies, or combinations, thereof;
at least one receiver configured to receive backscatter signals from the at least one wirelessly powered device; and
a controller configured to estimate channel information for the channels between the at least one of the wirelessly powered device and at least one of the multiple antennas based on the backscatter signals, wherein the controller is configured to adjust the wireless power signal at least in part by:
calculating all adjustments to the wireless power signal based on models of the wirelessly powered device, the transmitter, the receiver, or combinations thereof; and
applying calculated adjustments to the wireless power signal.

7. A method comprising:
transmitting a wireless power signal using a multiple antenna system, the multiple antenna system configured to transmit the wireless power signal using multiple antennas, multiple frequencies, or combinations thereof;
backscattering, by at least one wirelessly powered device, at least a portion of the wireless power signal to provide a backscatter signal;
receiving the backscatter signal at the multiple antenna system;
utilizing the backscatter signal to provide an estimate of channel information between the at least one wirelessly powered device and the multiple antenna system; and
adjusting the wireless power signal based on the estimate of the channel information, wherein said adjusting comprises adjusting the wireless power signal iteratively at least in part by:
applying initial adjustments to the wireless power signal;
calculating further adjustments based on models of the wirelessly powered device, the transmitter, the receiver, or combinations thereof; and
applying the further adjustments to the wireless power signal.

8. The method of claim 7, further comprising using the channel information in part to provide a desired data rate, signal-to-noise ratio, or combination thereof.

9. The method of claim 7, further comprising using the channel information to adjust the at least one receiver.

10. The method of claim 7, wherein said adjusting comprises adjusting a phase, an amplitude, or both of the wireless power signal based on the estimate of the channel information to control an amount of power transferred to the wirelessly powered device by the wireless power signal.

11. A method comprising:
transmitting a wireless power signal using a multiple antenna system the multiple, antenna system configured to transmit the wireless power signal using multiple antennas, multiple frequencies, or combinations thereof;
backscattering, by at least one wirelessly powered device, at least a portion of the wireless power signal to provide a backscatter signal;
receiving the backscatter signal at the multiple antenna system;
utilizing the backscatter signal to provide an estimate of channel information between the at least one wirelessly powered device and the multiple antenna system; and
adjusting the wireless power signal based on the estimate of the channel information, wherein said adjusting comprises adjusting the wireless power signal iteratively at least in part by:
calculating all adjustments to the wireless power signal based on models of the wirelessly powered device, the transmitter, the receiver, or combinations thereof; and
applying calculated adjustments to the wireless power signal.

12. A method comprising:
transmitting a wireless power signal using a multiple antenna system, the multiple antenna system configured to transmit the wireless power signal using multiple antennas, multiple frequencies, or combinations thereof;
backscattering, by at least one wirelessly powered device, at least a portion of the wireless power signal to provide a backscatter signal;
receiving the backscatter signal at the multiple antenna system; and
utilizing the backscatter signal to provide an estimate of channel information between the at least one wirelessly powered device and the multiple antenna system, wherein utilizing the backscatter signal to provide the estimate of the channel information comprises taking a ratio of backscatter signals received by certain antennas of the multiple antenna system and a particular backscatter signal received by a particular antenna of the multiple antenna system.

13. A method comprising:
transmitting a wireless power signal using a multiple antenna system, the multiple antenna system configured to transmit the wireless power signal using multiple antennas, multiple frequencies, or combinations thereof;

backscattering, by at least one wirelessly powered device, at least a portion of the wireless power signal to provide a backscatter signal;

receiving the backscatter signal at the multiple antenna system; and utilizing the backscatter signal to provide an estimate of channel information between the at least one wirelessly powered device and the multiple antenna system, wherein utilizing the backscatter signal to provide the estimate of the channel information comprises taking a ratio of backscatter signals received at certain frequencies of the multiple frequency system and a particular backscatter signal received at a particular frequency of the multiple antenna frequency.

14. A system comprising:

a wirelessly powered device comprising:
  a power harvester configured to harvest power from wireless power signals incident on the wirelessly powered device; and
  a backscatter transmitter configured to backscatter at least a portion of the wireless power signals to provide a backscatter signal; and a multiple antenna system comprising:
  multiple antennas;
  a receiver configured to receive the backscatter signal; and
  a transmission system configured to provide the wireless power signals at one or more frequencies for transmission by each of the multiple antennas in accordance with a cost function configured to achieve a desired power transfer to the wirelessly powered device and in accordance with an estimate of channel information, wherein the channel information is determined from the backscatter signal received at the wirelessly powered device.

15. The system of claim 14, wherein the power harvester comprises a diode.

16. The system of claim 14, wherein the backscatter transmitter comprises a transistor.

17. The system of claim 14, wherein the backscatter signal is provided at a harmonic frequency of the wireless power signals.

18. The system of claim 14, wherein the multiple antenna system comprises multiple units distributed about an environment, each unit comprising at least one of the multiple antennas and at least a portion of the transmission system.

* * * * *